US006632525B1

United States Patent
Farrington et al.

(10) Patent No.: US 6,632,525 B1
(45) Date of Patent: Oct. 14, 2003

(54) MATERIAL AND METHOD FOR MANUFACTURING PLASTIC PARTS

(75) Inventors: Stephen D. Farrington, Kingston, NH (US); Kenneth J. Mazzochi, Dover, NH (US)

(73) Assignee: Textron Automotive Company, Inc., Troy, MI (US)

( * ) Notice: Subject to any disclaimer, the term of this patent is extended or adjusted under 35 U.S.C. 154(b) by 110 days.

(21) Appl. No.: 09/685,444

(22) Filed: Oct. 11, 2000

(51) Int. Cl.[7] ............................................. B32B 33/00
(52) U.S. Cl. ........................ 428/397; 428/402; 428/407; 264/13; 264/14; 264/15; 264/140; 264/141; 264/142; 264/143; 264/301; 264/302; 264/310; 264/311
(58) Field of Search ................. 428/402, 407, 428/397; 264/13, 14, 15, 140–143, 301, 302, 310, 311

(56) References Cited

U.S. PATENT DOCUMENTS

| | | | |
|---|---|---|---|
| 4,389,177 A | 6/1983 | Colby | 425/144 |
| 4,621,022 A | * 11/1986 | Kohaut et al. | 428/397 |
| 4,621,995 A | 11/1986 | Wersosky | 425/144 |
| 4,623,503 A | 11/1986 | Anestis et al. | 264/302 |
| 4,722,678 A | 2/1988 | Wersosky | 425/145 |
| 4,728,276 A | 3/1988 | Pauley et al. | 425/67 |
| 4,878,827 A | 11/1989 | Muller | 425/434 |
| 4,923,657 A | 5/1990 | Gembinski et al. | 264/73 |
| 4,979,888 A | 12/1990 | Bauer et al. | 425/174.4 |
| 5,046,941 A | 9/1991 | Batchelder et al. | 425/435 |
| 5,106,285 A | 4/1992 | Preston | 425/144 |
| 5,525,274 A | 6/1996 | Grimmer | 264/13 |
| 5,525,284 A | 6/1996 | Grimmer | 264/301 |
| 5,597,586 A | 1/1997 | Wilson et al. | 425/67 |
| 5,654,102 A | 8/1997 | Grimmer | 428/402 |
| 5,998,030 A | * 12/1999 | Grimmer | 428/402 |

* cited by examiner

Primary Examiner—Leszek Kiliman
(74) Attorney, Agent, or Firm—Grossman, Tucker, Perreault & Pfleger, PLLC

(57) ABSTRACT

A plastic particle is formed of a plastic material having at least one integral protruding ring disposed on its outer surface. The ring may be continuous or intermittent around a perimeter of the plastic particle. Preferably, the particles have an outer diameter in the range of 0.007 inches to 0.040 inches.

19 Claims, 5 Drawing Sheets

MATERIAL AND METHOD FOR MANUFACTURING PLASTIC PARTS

FIELD OF THE INVENTION

This invention relates generally to materials and methods for manufacturing plastic parts and, more particularly, for manufacturing plastic shells or skins by applying plastic particles to a heated forming surface.

BACKGROUND OF THE INVENTION

U.S. Pat. No. 5,998,030 recites that individual particles formed by the high intensity mixer process have a roughened surface with fissures and cracks therein. Further, the '030 Patent goes on to recite that the use of such irregularly shaped particles in processing that includes feeding the particles to a point of use and casting the particles on a heated mold to melt flow the particles and cool them to form thin plastic shells presents several problems. In the case of slush molding, the particles are retained in a powder box that is rotated to direct an excess charge of material into a mold cavity. Such thermoplastic, irregular particles do not flow smoothly from all corners of a powder box. Furthermore, such particles do not smoothly flow into all parts of complex shaped molds of the type having tight return passages and very small mold surface features that simulate features such as leather grains, stitching or the like. As a result, it is necessary to vibrate the powder box and molds during the various processing steps so that the particles will flow against heated mold surfaces so as to melt and form a skin or shell shape corresponding to the shape of the heated mold surface. The irregular shape also produces an uneven buildup of material on the heated mold surface such that the particles do not melt and flow uniformly against the heated mold surface. As a consequence, the resultant cast part can have an irregular backside surface (i.e. opposite the mold surface). Such irregularities on the backside require that the nominal thickness of the part be larger than required for a given application which in turn takes more material than in the case of a part that has a uniform shape on its backside. The '030 Patent goes on to disclose among other things, a thermoplastic microsphere comprising thermoplastic resin melt blended with pigment, said pigment comprising less than 5% by weight of said blend, said microspheres having an outer diameter in the range of 0.007" to 0.040".

SUMMARY OF THE INVENTION

According to one aspect of the invention, a plastic particle is provided comprising a plastic material and having an integral protruding ring section disposed on its outer surface. The ring may be continuous or non-continuous around a perimeter of the plastic particle. The particles optionally have an outer diameter in the range of 0.007 inches to 0.040 inches.

According to another aspect of the invention, a method of forming a plastic particle comprising a plastic material and having at least one integral protruding ring disposed on its outer surface is provided. The method comprises the steps of providing a plastic particle capable of forming at least one protruding ring on the outer surface of the plastic particle and heating the plastic particle until at least one integral protruding ring is disposed on the outer surface of the particle. The method may also include the step of cooling the plastic particle after the ring is disposed on the outer surface of the particle. The method may also include the steps of providing a die with at least one die hole, extruding the plastic material through the die hole, severing the extrudate to create a plastic particle, and cooling the plastic particle before the ring is disposed on the outer surface of the particle.

According to another aspect of the invention, a method of forming a plastic article from a plurality of plastic particles is provided. The method comprises the steps of providing a plurality of plastic particles, providing a forming surface for forming the plastic article, applying the plurality of plastic particles on the forming surface, heating the plastic particles while the plastic particles are disposed on the forming surface; and flowing the plastic particles while the plastic particles are disposed on the forming surface to form at least one integral protruding ring on the outer surface of at least one particle. The method may also include the steps of continuing to flow the plastic particles while the plastic particles are disposed in the forming surface to join the particles and form the plastic article, cooling the forming surface, and removing the molded article from the forming surface. Preferably, the plastic article comprises the shell or skin of an interior trim panel for a motor vehicle.

BRIEF DESCRIPTION OF THE DRAWINGS

To better understand and appreciate the invention, refer to the following detailed description in connection with the accompanying drawings.

DESCRIPTION OF THE PREFERRED EMBODIMENT

Figure 1:
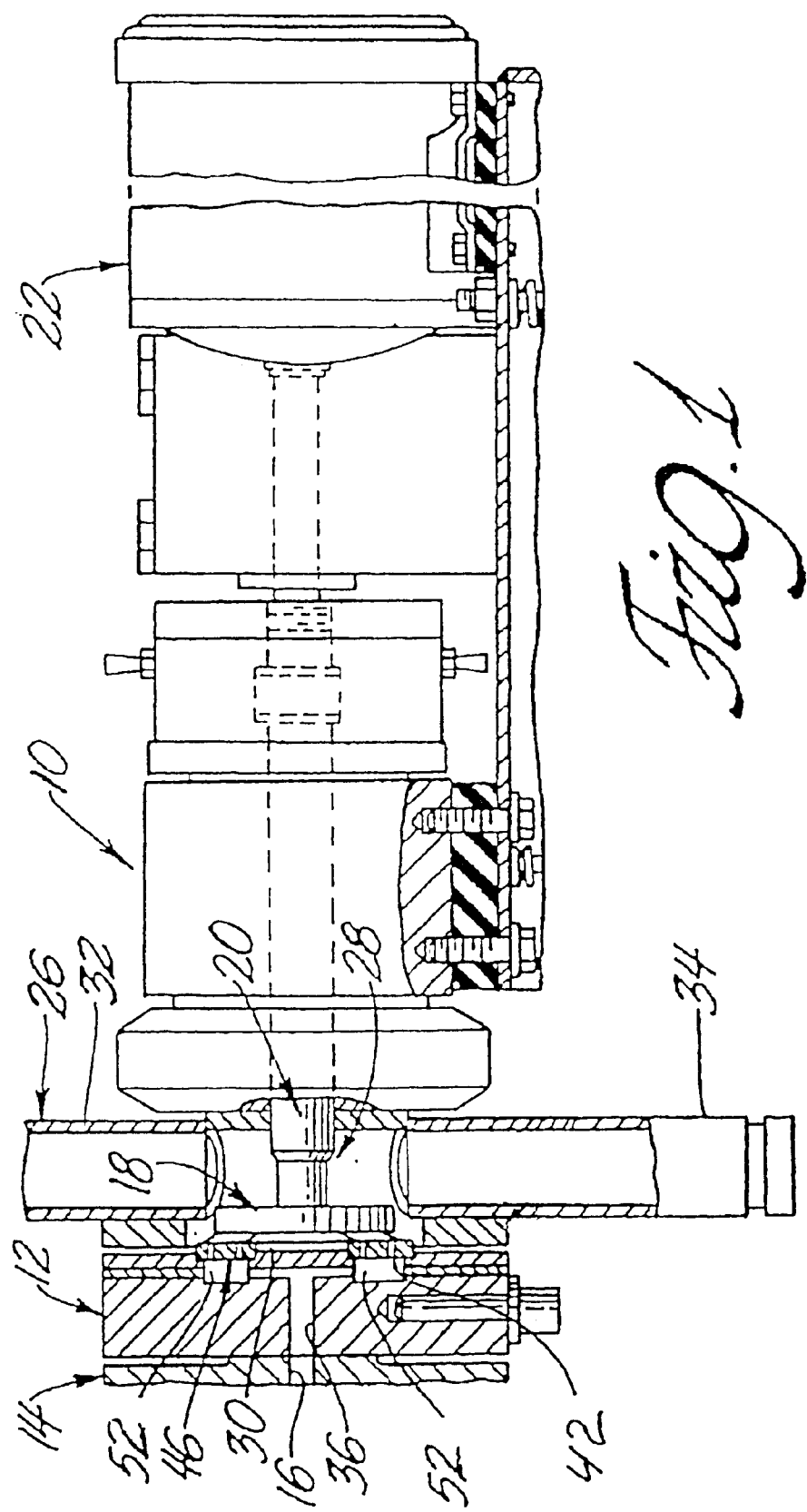
FIG. 1 is a side elevation view of an underwater thermoplastic pelletizer having an extruding die system incorporated therein and wherein the extruding die is shown in section and other parts of the pelletizer are broken away.

Referring to FIG. 1, there is illustrated an underwater pelletizer 10 and extruding die 12 which is of the type disclosed in U.S. Pat. Nos. 4,728,276 and 5,597,586 which are hereby incorporated by reference. The pelletizer die system basically comprises a transition device 14 that feeds molten plastic from a source (not shown), such as an extruder, through a passage 16 to the passage 36 of die 12. From passage 36, the plastic enters cavities 52 and then die holes 42 of die plate 46. Upon exiting die holes 42, a multibladed cutter 18 that is driven through a shaft 20 by a motor 22 severs the plastic extruded from the die holes 42 in the die plate 46 into particles. A water circulating system generally designated at 26 includes a water box 28 enclosing the cutter 18 and the face 30 of the die 12. Cooled water is delivered to the water box 28 by a feed line fitting 32 where it acts to solidify the extruded plastic for cutting and wherein the particles that are cut in such an underwater environment are then conveyed along with the now warmed water from the water box by a return line fitting 34. The particles are then collected from the return line in a conventional manner prior to the water being cooled again and recirculated through the water box 28.

With regards to processing temperatures, an exemplary thermoplastic plastic material such as flexible polyvinyl chloride, is generally heated in the extruder to a temperature of about 325 degrees Fahrenheit. Upon transitioning through the die 12, generally the plastic temperature is increased about 50 degrees Fahrenheit to about 375 degrees.

As the plastic exits the die 12, and while not being bound to a particular theory, boundary layer flow dictates that the flow of the plastic material in the center of the die holes 42 travels at a rate faster than the flow of the plastic material adjacent the die plate surface defining dies holes 42. Consequently, as a result of the differences in relative velocities, the profile of the plastic material initially exiting the die holes 42 will take on a curved outer surface, such as that of a hemisphere. A blade on the multibladed cutter 18 then severs the portion of the extrudate which has exited the face 30 of the die plate 46 of die 12, to create an individual particle. Surface tension then acts on the particle to form a bead. In other words, molecules on the surface of the particle experience a net attraction towards the interior of the particle. These centrally directed forces cause the particle to assume a spheroidal shape. The bead is then cooled by water from the water box 28 with a temperature of about 180 degrees Fahrenheit.

During the severing of the individual particle from the die 12, the impact of the multibladed cutter 18 on the plastic is believed to create an inwardly directed (e.g. compressive) stress which is absorbed into the plastic material as a result of the plastic's elastic properties. In the formation of the bead, there is apparently insufficient time for the strain induced during processing to completely recover and be dispelled from the plastic material before the particle is cooled and flow reduced, thus becoming frozen into the material. Consequently, the stress and strain, and associated energy, induced into the particle from the severing action of the multibladed cutter 18 is captured during the forming of the bead.

Figure 2:
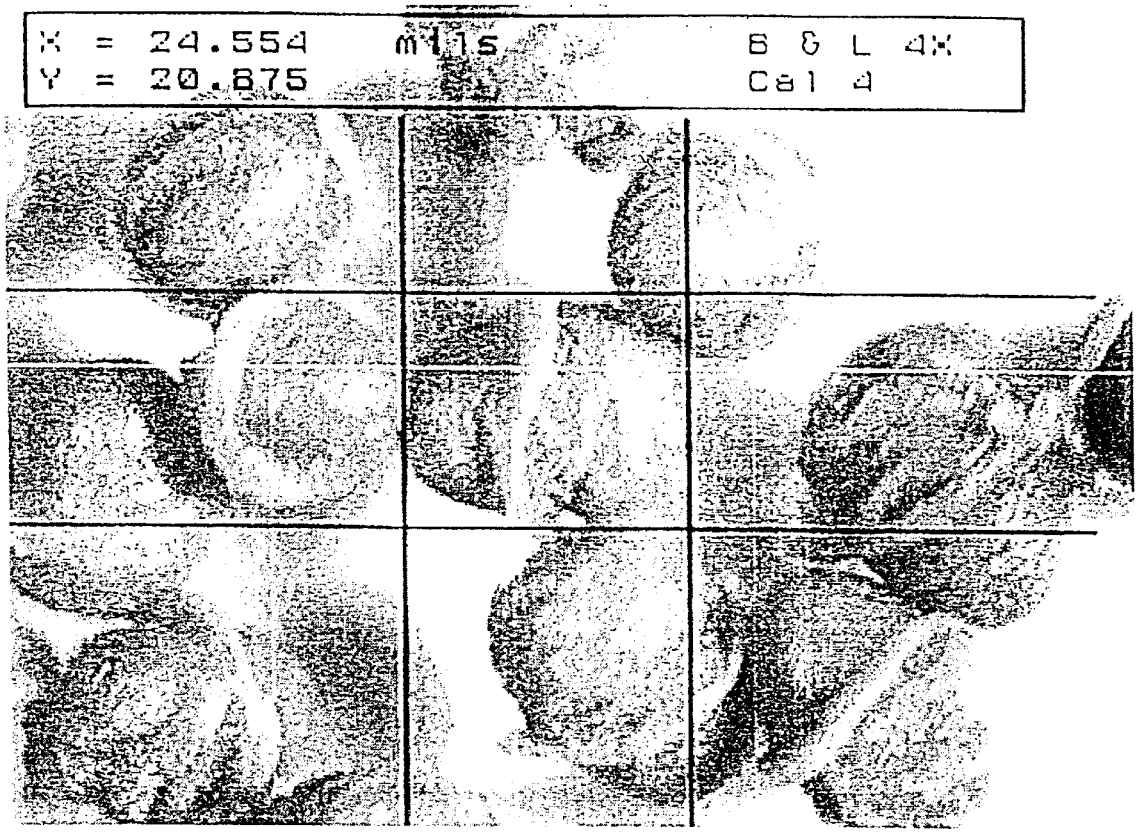
FIG. 2 is a photomicrograph of the particle herein containing an integral protruding ring section.

After forming and cooling the beads, the beads may be heated to form a distinct ring structure around a portion of the bead as shown in FIG. 2. By heating the bead, the stress and strain induced into the particle from the severing action of the multibladed cutter 18 during the forming of the bead is apparently released. The release of the stress and strain, and associated decompression of any compressed areas of the bead, exhibits itself in the form of plastic flow which creates a ring structure surrounding the particle. It is believed that the ring coincides with that portion of the particle adjacent the sever created by the cutter. The ring may be continuous around the particle or discontinuous.

Beads which have been found to form a surrounding ring structure during heating include polyvinyl chloride beads purchased from Teknor Apex under the grade designation 93-A0901C-59. More particularly, polyvinyl chloride beads were heated from room temperature on a hot plate at a rate of approximately 360° F. per minute (200° C./min.). At approximately 170° F., the formation of a ring structure surrounding certain beads became initially apparent. With continued heating to approximately 190° F., the formation of a ring structure surrounding additional beads became apparent, as well as the continued formation and definition of the ring structure surrounding those beads first exhibiting the ring structure. Of course, when the beads reach their respective flow temperature, and convert to a plastic melt, the ring structure noted herein is no longer present in favor of a viscous fluid state.

Figure 3:
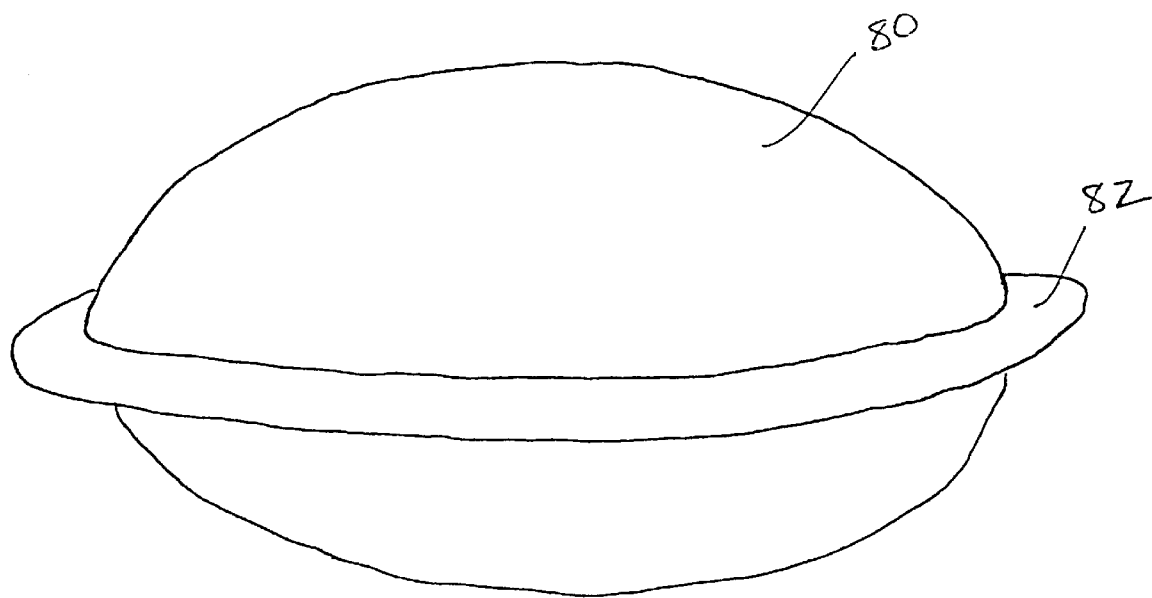
FIG. 3 is a schematic view of a plastic particle with a continuous ring structure according to the present invention.

It has been found that the ring structure may be preserved after formation by cooling the particle. Specifically, polyvinyl chloride particles heated to 200° F. were instantaneously cooled with water at a temperature of 60° F. Alternatively, the beads were cooled with ambient air at a temperature of 75° F. With this ring structure geometry, the particles may be used as a raw material form for future plastic molding processes. The particle may also be used as a decorative device for jewelry such as a beaded necklace, entertainment devices such as kaleidoscopes, or artistic devices such as candles and bead towers. Attention is next directed to FIG. 2 which provides an actual photomicrograph of the particle herein containing an integral protruding ring section. FIG. 3 provides a schematic view of a plastic particle 80 containing a continuous integral protruding ring 82 disposed on its surface. In accordance with the present invention, ring 82 has been found to protrude about 0.0002 inches from the surface of particle 80.

Figure 4:
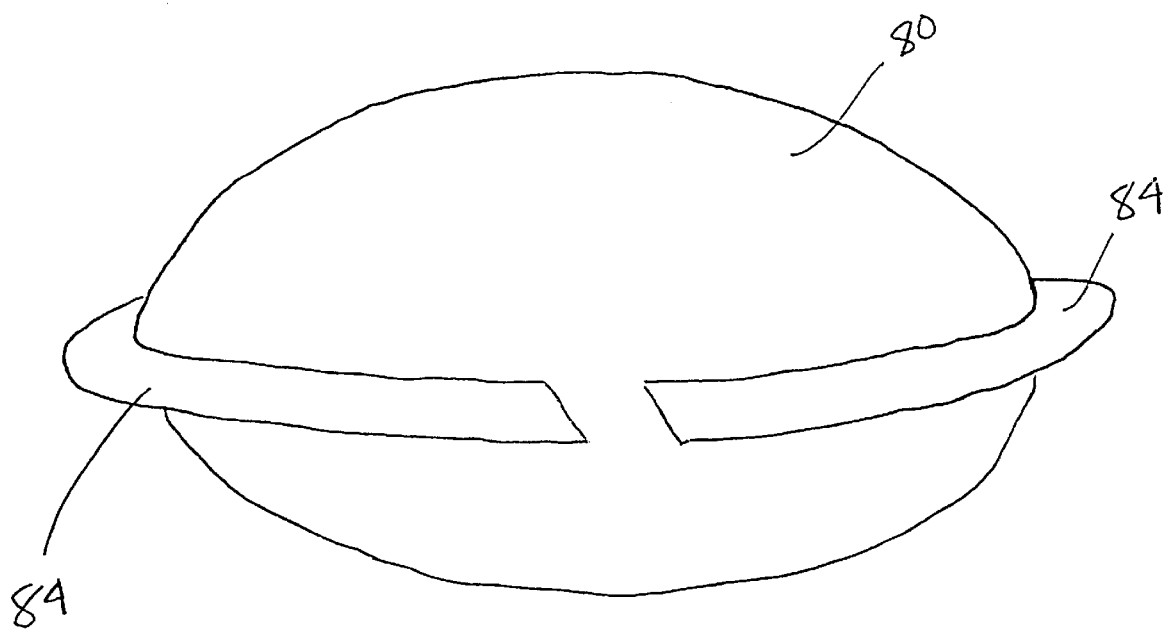
FIG. 4 is a schematic view of a plastic particle with a non-continuous ring structure according to the present invention.

Next, turning to FIG. 4, illustrated is particle 80 containing non-continuous ring structure 84 on the surface thereof. Similar to the above, such protrusion falls in the range of about 0.0002–0.0005 inches. However, in the context of the present invention, protrusions between 0.0002–0.0010 inches are contemplated, including 0.0001 inch increments therebetween.

Figure 5:
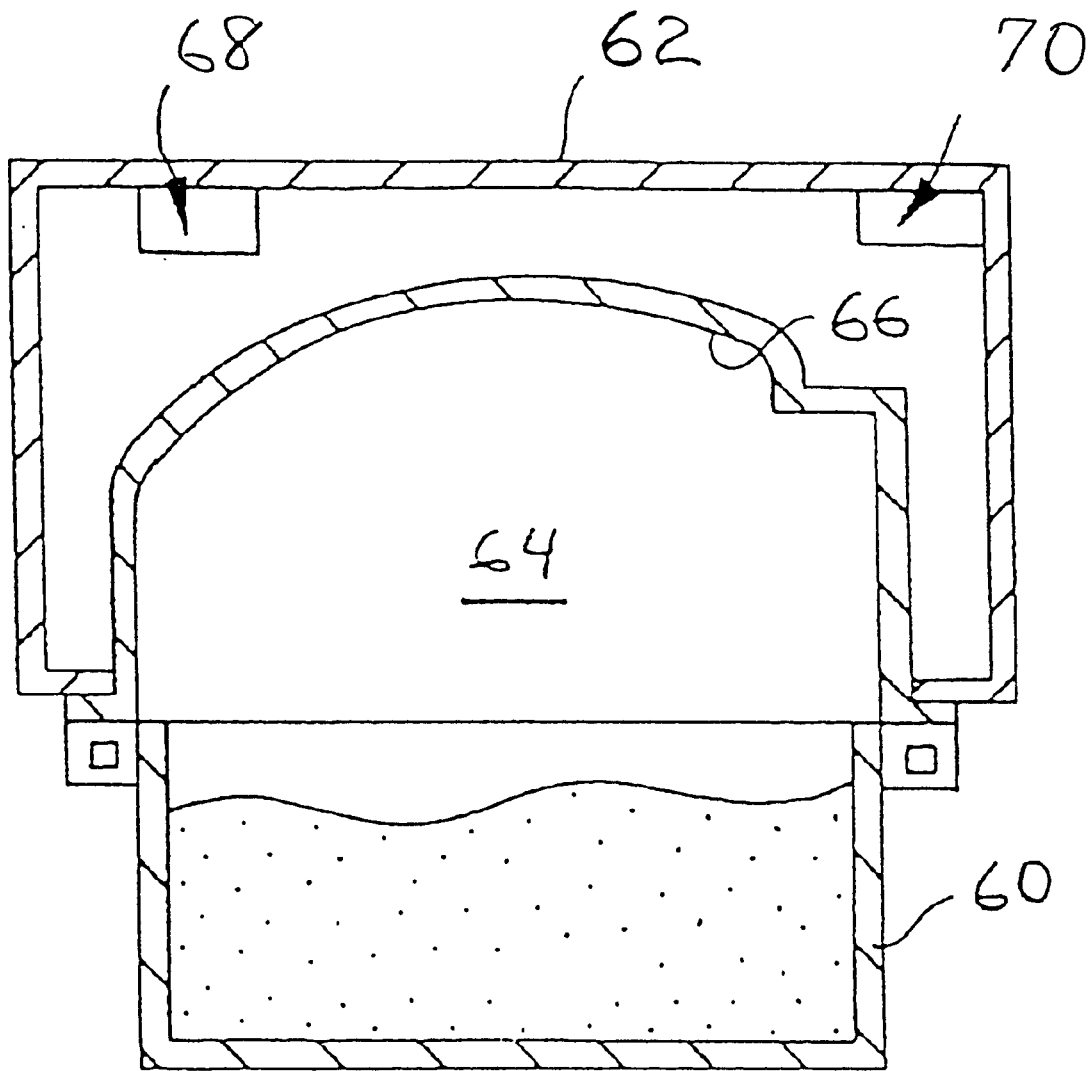
FIG. 5 is a diagrammatic view of apparatus used to practice a slush molding.

As contemplated herein, the use of plastic particles which form a ring structure upon heating will be particularly advantageous in those plastic molding processes where a solid plastic particle is applied directly to a forming surface, such as roto-casting or slush molding. In slush molding as shown in FIG. 5, an excess charge of material is placed in a charge or powder box 60. The box 60 is connected to a mold 62 having a cavity 24 formed in part by a molding surface 66 heated or cooled by a suitable heater 68 or air cooling system 70. Once the box 60 is connected to the mold 62, the box 60 and mold 62 are inverted so that the excess charge of materials is dumped into the mold cavity 64. Typical slush molding apparatus is set forth in U.S. Pat. Nos. 4,722,678, 4,878,827 and 5,046,941 all owned by the assignee of the present invention and incorporated by reference. The aforesaid United States Patents include maintaining a static head of material over the layer of material that is dumped onto the molding surface 66 of the mold cavity 64. The heating system 68 provides heated air (other suitable heaters are suitable for use with the invention such as the hot oil heater of U.S. Pat. No. 4,389,177 or electrical heaters as shown in U.S. Pat. No. 4,979,888). The molding surface 66 is heated to cause the plastic particles to melt as they contact the molding surface 66 and are compacted thereon by the static head of the overlying material.

The mold cavity 64 is cooled by suitable air cooling or liquid cooling systems as shown in U.S. Pat. Nos. 4,621,995, 4,623,503 and 5,106,285, all owned by the assignee of the present invention and incorporated by reference. The shell is concurrently cooled and the powder box 60 and mold cavity 64 are separated so that the mold 62 is opened to remove the shell.

A suitable example herein of slush molding as set forth above includes PVC beads containing the aforementioned ring structure, at the following compositional distribution: 52.5% PVC resin, 31.5% plasticizers, 9.3% stabilizers, 1.5% pigment and 4.5% flow aids (all % by weight), and further having a diameter of from 0.007 inches to 0.040 inches. The process involved placing a charge of such beads greater than the weight of the finished product in a charge box and dumping the contents of the charge box into a mold cavity; heating the casting surface to melt a layer of beads that contact the casting surface and flowing the material into a shape corresponding to the heated casting surface; thereafter cooling the molded part and removing it from the mold.

Roto-casting (e.g. rotational casting and rotational molding) differs from slush molding in that a charge of such beads corresponding to the weight of the product to be molded is placed in a closed hollow heated mold, followed by centrifugally melt flowing the material into a shape corresponding to the heated mold surface; thereafter cooling the centrifugally molded part and removing it from the closed hollow heated mold.

The use of beads which form a ring structure upon heating are believed particularly advantageous in slush molding and roto-casting as a flow aid into the interstices between the molding particles. That is, slush molding with dry particles and the associated void interstices therebetween can result in molded articles which exhibit porosity. To counter this problem, a molding particle which may flow, to any degree, into such interstices under its own momentum is highly desirable. The use of beads which contain or form a ring structure upon heating offer such a flow characteristic with the formation of the ring structure. In creating the ring structure, the plastic flows into a shape with increased surface area thus increasing the surface area of the particle available for coating the mold surface which reduces the formation of porous molded articles, as noted above.

We intend the above description to illustrate embodiments of the present invention by using descriptive rather than limiting words. Obviously, there are many ways that one might modify these embodiments while remaining within the scope of the claims. In other words, there are many other ways that one may practice the present invention without exceeding the scope of the claims herein. For example, plastic materials in addition to the use of polyvinyl chloride include, but are not limited to thermoplastics such as polyurethane, polyolefins (e.g. polypropylene, polyethylene), polystryene and polyester. Still other plastic materials include thermoset materials.

We claim:

1. A plastic particle comprising a plastic material and having an integral protruding ring section disposed on the outer surface of said particle, wherein said particle has an outer diameter in the range of 0.007 inches to 0.040 inches.

2. The plastic particle of claim 1 wherein the particle has a protruding ring section protruding from the surface in the range of 0.0002 inches to 0.0010 inches.

3. The plastic particle of claim 1 wherein the plastic material comprises a thermoplastic material.

4. The plastic particle of claim 3 wherein the thermoplastic material comprises a polyvinyl chloride material.

5. The plastic particle of claim 3 wherein the thermoplastic material comprises a polyurethane material.

6. The plastic particle of claim 3 wherein the thermoplastic material comprises a polyolefin material.

7. The plastic particle of claim 6 wherein the polyolefin material comprises a polypropylene material.

8. The plastic particle of claim 6 wherein the polyolefin material comprises a polyethylene material.

9. The plastic particle of claim 3 wherein the thermoplastic material comprises a polystyrene material.

10. The plastic particle of claim 3 wherein the thermoplastic material comprises a polyester material.

11. The plastic particle of claim 1 wherein the plastic material comprises a thermoset material.

12. The plastic particle of claim 1 wherein the ring section is continuous around the perimeter of the plastic particle.

13. The plastic particle of claim 1 wherein the ring section is non-continuous around the perimeter of the plastic particle.

14. A method of forming a plastic particle comprising a plastic material and having an integral protruding ring section disposed on its outer surface, the method comprising the steps of:

providing a plastic particle having an outer diameter in the range of 0.007 to 0.040 inches comprising a plastic material which will form a protruding ring section on the outer surface of the plastic particle;

heating the plastic particle until at least said integral protruding ring section is disposed on the outer surface of the particle.

15. The method of claim 14, including the step of:

cooling the plastic particle after the ring section is disposed on the outer surface of the particle.

16. A method of forming a plastic particle comprising a plastic material and having an integral protruding ring section disposed on its outer surface, the method comprising the steps of:

providing a die with at least one die hole;

extruding the plastic material through the die hole;

severing the extrudate to create a plastic particle;

cooling the plastic particle wherein said particle has an outer diameter in the range of 0.007 to 0.040 inches;

heating the plastic particle to form said integral protruding ring section; and cooling the plastic particle containing said ring section.

17. A method of forming a plastic article from a plurality of plastic particles, the method comprising the steps of:

providing a plurality of plastic particles having an outer diameter in the range of 0.007 to 0.040 inches further;

forming a protruding ring section on said plastic particles;

providing a forming surface for forming a plastic article;

applying the plurality of plastic particles on the forming surface;

heating the plastic particles while the plastic particles are disposed on the forming surface; and flowing the plastic particles while the plastic particles are disposed on the forming surface to form said plastic article.

18. The method of claim 17, the method further comprising the steps of:

cooling the forming surface; and removing the molded article from the forming surface.

19. The method of forming a plastic article from a plurality of plastic particles of claim 17 wherein the plastic article comprises the shell or skin of an interior trim panel for a motor vehicle.

* * * * *